3,382,268
PROCESS FOR PREPARATION OF
METALLOCENES
Michael Cais, 21 Smolenskin St.,
Ahusa, Haifa, Israel
No Drawing. Continuation of application Ser. No.
314,855, Oct. 9, 1963. This application Apr. 11,
1967, Ser. No. 630,139
6 Claims. (Cl. 260—439)

This application is a continuation of application No. 314,855, filed Oct. 9, 1963, and now abandoned.

This invention relates to the preparation of the metallocenes.

Metallocenes are dicyclopentadienyl metal compounds. Best known among them is ferrocene, i.e. the metallocene in which the metal component is iron. Other known metallocenes comprise those in which the metal component is a transition metal, e.g. nickel, cobalt, ruthenium, or the like. Ferrocene can be used for a large number of different technical purposes, for most of which the other known metallocenes may also be suitable. For the sake of brevity, the invention will be explained and exemplified hereinafter with reference to ferrocene, but the wider applicability of the invention remains understood.

On a laboratory scale, ferrocene has so far been prepared by a method which takes a long time to produce ferrocene in batches which do not exceed 20–25 g. In this method a solution of cyclopentadiene in a primary or secondary aliphatic amine, usually diethylamine, is added to a slurry of ferrous chloride in a suitable anhydrous solvent, e.g. diethyl ether, the mixture is stirred for 14–16 hours, then the ferrocene formed is extracted with petroleum ether, from the extract the solvent is evaporated and the residue is purified, e.g. by recrystallisation or sublimation. The preparation of the ferrous chloride slurry takes as a rule about 4 hours, which time has to be added to the stirring time of 14–16 hours, so that the total time needed for the preparation of up to 25 g. of ferrocene is 18–20 hours.

It has also been suggested to replace the ferrous chloride with ferrous bromide the preparation of which proceeds much more rapidly than that of ferrous chloride, whereby the total time needed for the preparation of ferrocene could be lowered by about 3 to 3½ hours.

The invention provides a process for the preparation of metallocene in which the reaction of the metal compound with cyclopentadiene is considerably speeded up and is amenable to the production of large batches.

In the process according to the invention the reaction mixture containing the suspension of a compound of the metal to be combined with cyclopentadiene in a suitable solvent is admixed with a solution of cyclopentadiene in an amine to which there has been added a catalytic amount of a quaternary alkyl or aralkyl ammonium base.

The quaternary base catalysts encompassed by the present invention can be generically represented by the following formula:

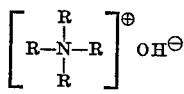

wherein each R individually represents alkyl, aryl or aralkyl. The alkyl group is preferably 1–5 carbon atoms though longer chain lengths, i.e. 1–10 carbon atoms, are also encompassed by the present invention. Benzyl is the preferred aryl group.

Benzyl-trimethyl-ammonium hydroxide has been found to be particularly suitable. Other suitable quaternary bases are, for example, tetramethyl and tetraethyl ammonium hydroxide.

The preferred quantity of catalyst is: 0.05–15% by weight on the basis of the cyclopentadiene added. 1% to 10% is most preferred.

It is believed that the presence of the quaternary ammonium base in the reaction mixture facilitates the ionization (formation of carbanions) of the cyclopentadiene, and the appreciably increased concentration of cyclopentadienyl anions makes for a speedier reaction with the metal ions to form the desired metallocene.

The amine used as a cyclopentadiene solvent may be a primary, secondary or tertiary alkyl or aralkyl amine, but for the purposes of this invention the term "amine" also includes heterocyclic nitrogen bases such as pyridine, pyrrole, quinoline, pyrimidine and the like.

Saturated heterocyclic nitrogen bases contemplated by the present invention are those having the formula:

wherein R is H, aralkyl or alkyl of 1–10 carbon atoms and $n$ is 4–7. The invention is not restricted to saturated heterocyclic nitrogen bases, however, but also encompasses unsaturated heterocyclic nitrogen bases such as the pyrimidines.

Where the method according to the invention is applied to the preparation of ferrocene, ferrous bromide is used with particular advantage as the ferrous halide serving as a starting material. However, any other form of the ferrous ion may be employed. Thus other halides such as ferrous chloride are encompassed by the present invention. A chelate may be employed if desired.

The metals particularly contemplated by the present invention are the transition metals, i.e., those having atomic numbers of 22–28 and 40–46 such as manganese, cobalt, nickel, vanadium, etc.

It has been found that the synthesis of 100 g. batches of ferrocene can be achieved in a total time of about six hours, as compared to the nearly twenty hours needed in the conventional method (with ferrous chloride) for the preparation of about 25 g. of ferrocene.

The invention is illustrated by the following example to which it is not limited.

Example 128 g. (0.8 mole) of bromine was added under nitrogen is small portions over a period of 20 minutes to a suspension of 89.6 g. (1.6 mole) of iron powder in 1 liter of dimethoxyethane. The temperature of the reaction mixture was kept at 20° C. by cooling with iced water. After all the bromine had been added to the mixture the latter was refluxed under nitrogen for 20 minutes, then cooled to about 10° C. and to it there was introduced over a period of 10 minutes under vigorous stirring and with continued cooling a mixture of 105.6 (1.6 mole) of cyclopentadiene, 500 ml. of diethylamine and 5 ml. of a 40% by weight methanolic solution of benzyl-trimethylammonium hydroxide. The mixture was then stirred under nitrogen for another 2 hours at room temperature. Then the solvents were evaporated in vacuo (at the reduced pressure produced by a water jet pump) and the residue was extracted with seven successive portions of petroleum ether (B.P. 60–80° C.) of 700 ml. each. From the combined petroleum ether extracts the petroleum ether was evaporated and a residue of about 98 g. of ferrocene of M.P. 172–174° C. was obtained which did not require further purification.

What is is claimed is:

1. In a process for the preparation of metallocenes wherein the reaction mixture contains a suspension of a compound of the metal to be combined with cyclopentadiene in an amine, the improvement which comprises catalyzing said reaction with a material taken from the class consisting of

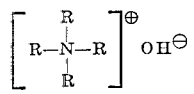

wherein R is a radical taken from the class consisting of alkyl, aryl and aralkyl wherein the alkyl group has from 1 to 1 carbon atoms.

2. A process according to claim 1, wherein the catalyst is benzyl-trimethyl-ammonium hydroxide.

3. A process according to claim 1, wherein ferrous bromide is used as the metal compound.

4. A process according to claim 1, wherein the amount of said catalyst is us to about 15% based on the cyclopentadiene.

5. A process according to claim 1, wherein the catalyst is tetramethyl ammonium hydroxide.

6. A process according to claim 1, wherein the catalyst is tetraethyl ammonium hydroxide.

No references cited.

TOBIAS E. LEVOW, *Primary Examiner.*

A. P. DEMERS, *Assistant Examiner.*